Jan. 5, 1937.  C. E. SKELTON  2,066,699
CARRIER FOR INDICATING GAUGES
Filed May 21, 1934   2 Sheets-Sheet 1
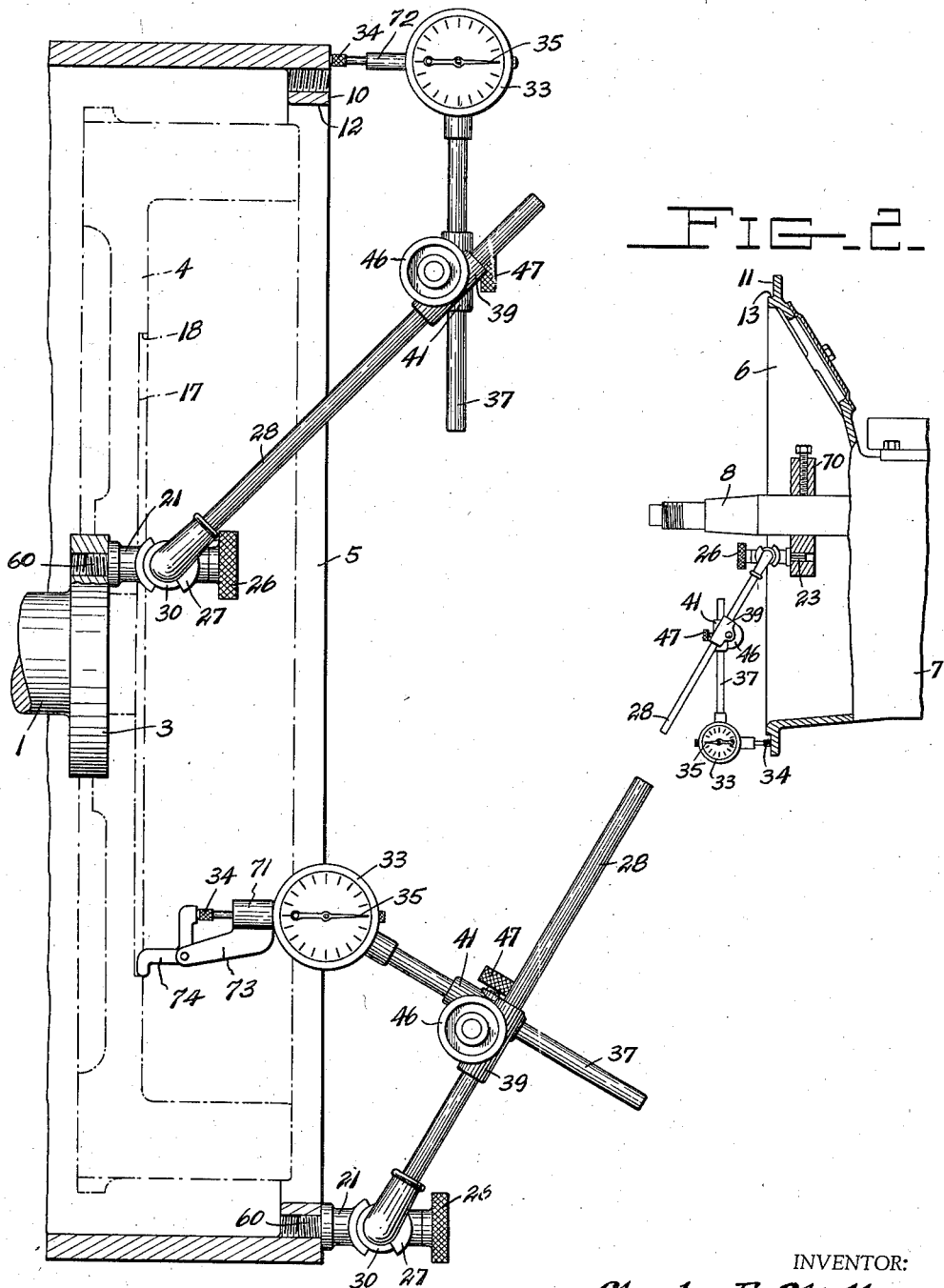
INVENTOR:
Charles E. Skelton,
BY Bodell & Thompson
ATTORNEYS.

Jan. 5, 1937. C. E. SKELTON 2,066,699
CARRIER FOR INDICATING GAUGES
Filed May 21, 1934 2 Sheets-Sheet 2
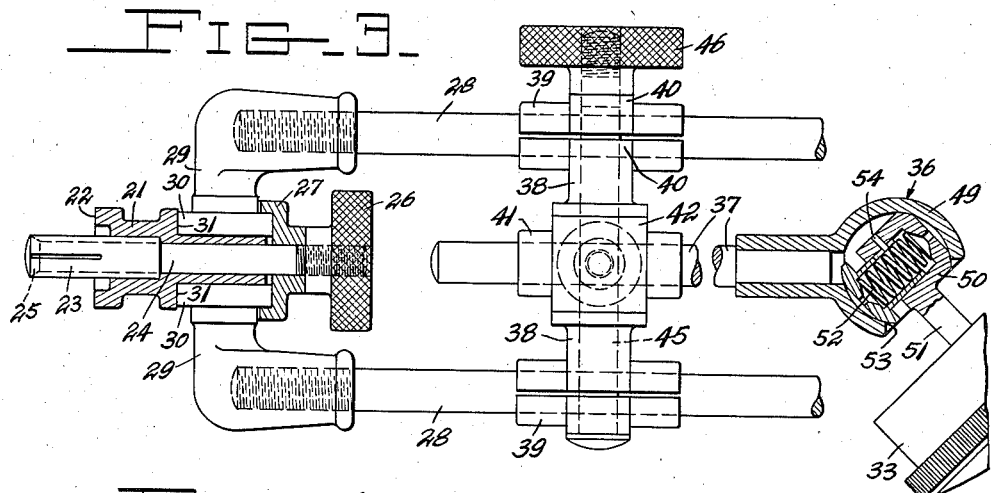
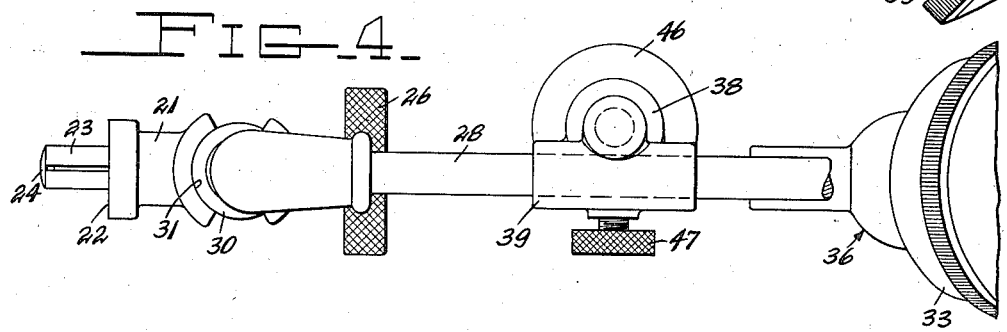
 
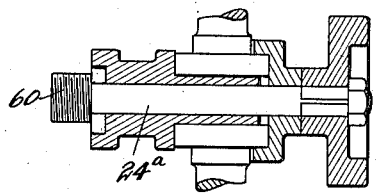 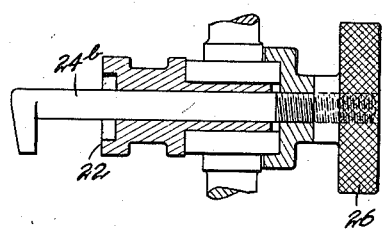
INVENTOR:
Charles E. Skelton,
BY Bodell + Thompson
ATTORNEYS.

Patented Jan. 5, 1937

2,066,699

UNITED STATES PATENT OFFICE 2,066,699

CARRIER FOR INDICATING GAUGES

Charles E. Skelton, Syracuse, N. Y., assignor to Ira Saks, Cleveland, Ohio

Application May 21, 1934, Serial No. 726,642

2 Claims. (Cl. 248—279)

This invention has for its object an indicating instrument particularly for indicating inaccuracies between the abutting surfaces of a fly wheel housing and clutch or bell housing of a unit power plant for motor vehicles, and inaccuracies between the abutting surfaces of the fly wheel housing and the bell housing and surfaces of the fly wheel with which the driven member of clutches coact or the fly wheel surfaces on which the outer drum of a multiple disk clutch is mounted, so that the inaccuracies having been indicated, the bell housing surfaces, and the fly wheel surfaces can be made accurate, thus avoiding misalinement of the clutch shaft relatively to the engine shaft, and insuring uniform engagement of the clutch throughout the entire friction surfaces of the clutch plate or the clutch disks.

It further has for its object, an instrument which is interchangeably mountable on the crank shaft to turn therewith in order to indicate inaccuracies in surfaces of the fly wheel housing which abut against the clutch or bell housing, and on the bell housing after any inaccuracies have been corrected, to indicate inaccuracies of the fly wheel surface; and also mountable on the clutch shaft to turn therein to indicate inaccuracies in the surfaces of the bell housing coacting with surfaces of the fly wheel housing.

It further has for its object an instrument for checking up inaccuracies in any abutting surface with a center shaft where accuracy in said surface relative to the shaft is requisite.

Other objects will appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a side elevation of this instrument showing the same as applied to the crank shaft flange and to the fly wheel flange, which are also shown partly in section, the fly wheel of the engine being shown in dotted lines.

Figure 2 is a fragmentary side view of the bell housing of a gear box showing the use of my instrument when checking up the surface of the flange of the bell housing with the crank shaft.

Figures 3 and 4 are, respectively, fragmentary elevations, partly in section of this instrument taken at a right angle to each other.

Figures 5 and 6 are longitudinal sectional views of the bracket of this instrument showing modifications of the attaching means of the bracket.

In unit power plants of motor vehicles, the fly wheel housing is mounted on the crank case of the engine concentric with the axial line of the crank shaft, the rear edge faces thereof coacting with the bell housing should be in a plane normal to, or at a right angle to, the axial line of the crank shaft, and when cylindrical, concentric with the axial line of the crank shaft, and also the surfaces of the fly wheel to which parts of the clutch mechanism are attached or with which they coact should, if annular, be normal to the axial line of the crank shaft or if cylindrical, exactly concentric with the axial line of the crank shaft.

When the power plant is assembled at the factory, all of these surfaces are assumed to be in their desired relation to the axial line of the crank shaft, but after continued use and the clutch wears, repairs are necessary, and in reassembling, it is more or less a hit or miss proposition as to whether these surfaces are exactly normal or concentric with the axial line of the crank shaft. The repairs themselves change conditions to such an extent that when the repair job is finished, the crank shaft and clutch shaft are not in exact axial alinement with each other, or with the fly wheel resulting in noisy gears, imperfectly acting clutches, etc.

The principal object of this invention is an instrument by which the annular or cylindrical critical surfaces of the fly wheel housing can be accurately checked with the axis of a master shaft, as the crank shaft of the engine, and then when any defects are remedied in this surface, the critical surfaces of the fly wheel checked from the corrected surface of the fly wheel housing. Also, if desirable, by this instrument, the surface of the bell housing, which abuts against the fly wheel housing, can be checked up with the axial line of the clutch shaft, as a master shaft. The clutch shaft in a unit power plant is usually the stem of the stem gear of the transmission gearing. In the present unit power plants, it is not as yet thought necessary to take special precaution to square the surfaces of the bell housing with the clutch shaft, as the squaring of the edge surfaces of the fly wheel housing with the axial line of the crank shaft and the squaring of the surfaces of the fly wheel with the end surface of the fly wheel housing, are thought to be sufficient to correct inaccuracies that would result in misalinements of the crank shaft and clutch shaft.

1 designates the crank shaft of the internal combustion engine of a unit power plant, this being mounted in the usual manner in a crank case not shown. The crank shaft is usually provided with an annular flange 3 at its rear end to which the fly wheel 4 is bolted. 5 designates the fly wheel housing, which is bolted or otherwise secured to the crank case concentric with the shaft 1.

6 designates the bell or clutch housing, which is rigid with and usually formed integral with the gear box 7. 8 is the clutch shaft mounted in bearings in the front wall of the gear housing 7, this being the stem of a gear in the gear box, the shaft 8 having a pilot bearing in the shaft 1 in the usual manner. The fly wheel housing 5 and the bell housing 6 have abutting annular surfaces 10, 11 which should be exactly normal to, or in a plane at a right angle to, the axis of the drive shaft 1, and also may have interfitting parts with cylindrical surfaces 12, 13, and these surfaces, particularly those on the fly wheel housing should be concentric with or normal to the axial line of the shaft 1, that is, the cylindrical surface 12 should be, as accurately as possible, concentric with the axial line of the shaft 1 and the annular surface 10 also concentric and arranged in the plane normal to the axial line of the shaft 1. In single plate clutches, the plate or disk of the driven member of the clutch on the clutch shaft 8 presses against an annular surface at the bottom of a recess in the fly wheel, and this surface should be as exactly normal as possible to the axial line of the crank shaft 1. Also, the back plate of the clutch is secured to the fly wheel 4 or abuts against a surface which should be as accurately as possible in a plane normal to the axial line of the shaft 1.

In multiple disk clutches, the outer drum of the clutch is sometimes mounted on the surface 17 with a hub portion coacting with a cylindrical surface 18 and the surfaces 17, 18, should be, as accurately as possible, in a plane normal to, or concentric, with the axial line of the shaft 1.

In initially assembling the unit power plant at the automobile factory, these parts are usually checked sufficiently for accuracy to pass inspection. However, when the clutch is being repaired by mechanics in an outside garage, and the parts of the repaired clutch reassembled in the same position, as at the factory, the same accuracies or near accuracies of the original factory assembly do not result, but on the other hand, inaccuracies result to such a degree that the gears are noisy and the operation or engagement of the clutches faulty.

By my instrument, any critical surfaces as the surfaces 10, 12, or 10 or 12 can be checked up from the crank shaft and the inaccuracies corrected, and, having been corrected, any critical surfaces of the fly wheel as 17, 18 or 17 or 18, can be checked up from the surface 10 of the fly wheel housing and any inaccuracies corrected. Any and all other surfaces that may be critical for a given installation may be checked. Those specifically referred to are illustrative only of a few possible critical surfaces. Also, the pilot bearing can be checked for alinement or concentricity.

This instrument comprises a bracket which is readily interchangeably and rigidly mountable on the crank shaft or the flange 3 thereof and on the flange of the fly wheel housing 5 on which the surface 10 is provided, an arm on the bracket and adjustable into different angular relations in a direction lengthwise of the axis of the shaft 1 and the clutch shaft 8, an indicator carried by said arm and connected thereto by an universal joint so as to be adjustable into different angular relation to coact with the surfaces 10 and 12, when the bracket is mounted on the flange 3 of the crank shaft 1 and to coact with the surfaces 17 or 18, when the bracket is mounted on the fly wheel housing 5.

When the inaccuracies are determined and located, they can be corrected by means of suitable tools for that purpose.

21 designates the bracket. This, as shown in Figures 3, 4, 5 and 6, consists of a sleeve having an abutting surface 22 at one end for thrusting against the fly wheel flange 3 or against the flange of the fly wheel housing, and being provided with means for attaching it to either of these flanges. Preferably, it is attached to these flanges by means which enter and fit the screw holes in the flanges, by means of which the fly wheel is attached to the crank shaft and the bell housing attached to the fly wheel housing. The instrument may also be attached by suitable brackets to either of two parts having a surface to be checked relative to the other part.

In Figures 3 and 4, this means is shown as an expander or collet consisting of an expansible sleeve 23 extending into one end of the sleeve or bracket 21 and projecting out of the same, the projecting portion being designed to enter one of the screw holes in the crank shaft flange 3 or a hole in the flange of the fly wheel housing, a stem 24 extending axially through the sleeve or bracket 21 and into the expander or collet sleeve 23, the stem having a conical head 25 coacting with an internal complemental conical surface of the expander sleeve 23 and a knurled nut or handle 26 threading on the opposite end of the stem 24 from that on which the expander sleeve 23 is located, and thrusting against a clamping member 27 which serves to hold the instrument carrying arm to the bracket. Obviously, as the knurled nut or handle 26 is turned, the sleeve 23 will be expanded against the walls of the hole in the fly wheel flange 3 or in the flange of the fly wheel housing, and thus rigidly secure the bracket 21 in position, and the surface 22 of the bracket 21 will thrust against the surface surrounding the hole.

28 designates the indicator carrying arm, this being shown as double or bifurcated and as clamped in any adjusted position to the bracket or sleeve 21 by the clamping member 27. As here illustrated, each bifurcation of the arm 28 is provided with an inturned angular portion 29 formed with a discoidal head 30, these heads fitting into complemental sockets on opposite sides of the bracket or sleeve 21, a portion of the socket being formed at 31 in the sleeve and the opposite portion being formed in the clamping member 27. The heads 30 and the socket members provide a pivotal joint permitting the arm 28 to be swung fore and aft in a plane radial to the crank shaft in order to bring the indicator in juxtaposition to the surfaces of the fly wheel housing of different depth, when the bracket 21 is mounted on the flange 3 of the crank shaft, and also to conform to different surfaces of the fly wheel to be tested when the bracket 21 is mounted in one of the holes in the flange of the fly wheel housing. When the arm 28 is adjusted to the desired angle, turning of the handle or nut 26 tightens it in this angular relation and at the same time secures the bracket 21 by expanding the split sleeve 23 in the hole in the crank shaft flange or in the hole in the flange of the fly wheel housing.

33 designates a suitable indicator having a detecting finger or feeler 34, the movement of which operates, through suitable mechanism, a pointer 35 which is movable over the dial of the indicator. The indicator is connected to the arm 28 through a universal joint 36, one section of which is carried by the indicator and the other by a stem 37 adjustable endwise relatively to the arm 28 to make the arm the proper length to arrange the indicator to coact with the flange of the fly wheel housing or any other surface to be checked, when the bracket 21 is mounted on the crank shaft flange, and to coact with the various surfaces of the fly wheel when the bracket 21 is mounted on the flange of the fly wheel housing or any other stationary surface. As here shown, this stem 37 is mounted in a carriage 38 adjustable along the bifurcations of the arm 28 and the carriage 38 is provided with guides, as split sleeves 39, extending along the bifurcations, which are here shown as rods, the guides or split sleeves 39 having jaws 40 on opposite sides of their splits, the carriage 38 being also provided with a sleeve 41 between the sleeves 39, and this is provided with a transverse hub 42. The hub abuts at its ends against the inner jaws 40 of the split sleeves. A bolt 45 extends through the jaws of the split sleeves 39 and through the hub 42, and a knurled nut or handle 46 threads on one end. By loosening of the knurled nut or handle 46, the carriage 38 can be adjusted along the bifurcations of the arm 28 and also the stem 37 swung about the bolt, as a pivot, into any desired angle and upon tightening of the knurled nut 46, the parts are clamped in their adjusted position. The stem 37 is here shown as held in its endwise adjusted position by means of a set screw 47 threading radially into the sleeve 41 with its end against the stem 37. The universal joint connecting the stem 37 and the indicator 33 includes the socket 36 and a ball 50 in the socket, which ball is carried by a stem 51 rigid with the indicator 33. The ball 50 is composed of two radial sections with a spring 52 between them, and to insert the ball in the socket, the sections are compressed in order that the ball may pass through the mouth 53 of the socket and after the ball is in the socket, the spring allowed to react. A pin 54 is provided to prevent relative rotative movement of the two ball sections.

As seen in Figure 5, the means for attaching the bracket to the crank shaft flange 3 or to the flange of the fly wheel housing instead of being an expander or collet may be threads to fit the threaded hole in either the flange of the fly wheel housing or fly wheel flange, and as shown, the stem 24ᵃ may be provided with threaded stud 60 at its end instead of the split sleeve 23, this threaded head fitting the threaded hole in the crank shaft flange and in the flange of the fly wheel housing.

As seen in Figure 6, the bracket 21 or the clamping stem 24ᵇ thereof, may be provided with a jaw which together with the end face 22 of the bracket or sleeve 21 forms a clamp for clamping a flange either over the outside rim thereof or through the screw hole. The clamp or jaw is operated by the turning of the knurled nut 26.

In operation, the bracket 21 is attached to the fly wheel flange and the arm 28 adjusted into the proper angular relation to coact with the surface 10 or any other surface to be checked and the crank shaft turned so that the instrument turns as a crank therewith with the feeler or finger 34 of the indicator moving over the surface 10. If the indication is the same during the entire circle of movement, the surface is correct, but if there are any appreciable movements of the feeler from its starting position, the portions of the surface 10 engaged by the feeler when the movements occur are "high" or "low" and hence, the surface 10 is trimmed off with a tool for that purpose, until the indications of the indicator are the same throughout the entire circle within certain limits of accuracy. When desired, the other surface 12 can be similarly tested by adjusting the indicator so that its feeler 34 will coact with said surfaces. The surfaces 10 or 12 having been tested, when the bracket 21 is mounted in one of the holes of the flange or the fly wheel housing 5. The indicator is adjusted so that the feeler coacts with the surface 17 or 18, or any other critical surfaces for that particular job. As seen in Figure 2, the surfaces, as 11, of the bell housing may be checked with the clutch shaft 8 as a standard or master shaft by first mounting a collar 70 on the shaft 8 to which to attach the bracket 21 of the instrument.

In testing cylindrical surfaces, a collar 71 is mounted on the guide 72 for the feeler 34 of the indicator, this collar having an arm 73 to which is pivoted an angle lever 74. One arm of the angle lever engages the cylindrical surface being tested and the other arm contacts the end of the feeler 34.

This instrument is readily applied to either the crank shaft flange or the flange of the fly wheel housing, and is readily adjusted to the conditions as diameters of the fly wheel housing, and the fly wheel and depth and location of the surfaces to be tested and with the instrument a garage mechanic can accurately replace a repaired clutch and detect any inaccuracies that must be corrected to avoid misalinements.

What I claim is:

1. A carrier for indicating gauges comprising a bracket having means for attaching it to a support, an arm adjustably pivoted to the bracket and shiftable into different angular positions relative thereto, a carriage adjustable lengthwise of the arm, a second arm for carrying the gauge, the second arm being mounted in the carriage and adjustable endwise relatively thereto and also pivotally relatively thereto, and means for holding the first arm in its adjusted position, the first-mentioned means and the last-mentioned means having an operating member in common.

2. A carrier for indicating gauges comprising a bracket having means for attaching it to a support, an arm adjustably pivoted to the bracket and shiftable into different angular positions relative thereto, a carriage adjustable lengthwise of the arm, a second arm for carrying the gauge, the second arm being mounted in the carriage to have endwise adjustment relatively thereto and also a pivotal adjustment, and means operable to hold said arms and the carriage in their adjusted position, the means for holding the first arm in its pivotally adjusted position and the bracket attaching means having an operating member in common and the means for holding the carriage and the second arm in their adjusted positions including a single operating member.

CHARLES E. SKELTON.